United States Patent
Klekamp et al.

(10) Patent No.: US 6,816,635 B2
(45) Date of Patent: Nov. 9, 2004

(54) OPTICAL WAVEGUIDE PHASE SHIFTER

(75) Inventors: Axel Klekamp, Markgröningen (DE); Henning Bülow, Kornwestheim (DE)

(73) Assignee: Avanex Corporation, Fremont, CA (US)

(*) Notice: Subject to any disclaimer, the term of this patent is extended or adjusted under 35 U.S.C. 154(b) by 128 days.

(21) Appl. No.: 10/326,614

(22) Filed: Dec. 23, 2002

(65) Prior Publication Data

US 2003/0133636 A1 Jul. 17, 2003

(30) Foreign Application Priority Data

Jan. 14, 2002 (EP) .............................. 02360029

(51) Int. Cl.$^7$ ................................ G02F 1/01
(52) U.S. Cl. ............................ 385/1; 385/4; 385/128; 385/141; 372/6; 359/341.5
(58) Field of Search .................. 385/1–4, 14, 128–132, 385/141; 372/6; 359/341.5

(56) References Cited

U.S. PATENT DOCUMENTS

| | | | | |
|---|---|---|---|---|
| 5,519,803 A | * | 5/1996 | Shiono et al. | 385/132 |
| 6,377,716 B1 | * | 4/2002 | Veldhuis et al. | 385/1 |
| 6,538,805 B1 | * | 3/2003 | Norwood et al. | 359/341.5 |

FOREIGN PATENT DOCUMENTS

| | | |
|---|---|---|
| EP | 0 607 782 A1 | 7/1994 |
| EP | 0 997 765 A2 | 5/2000 |
| EP | 1 170 621 A1 | 1/2002 |

* cited by examiner

Primary Examiner—Phan T. H. Palmer
(74) Attorney, Agent, or Firm—Moser, Patterson & Sheridan, L.L.P.

(57) ABSTRACT

The present invention provides an optical waveguide phase shifter that comprises a planar silicon-dioxide-containing optical glass waveguide whose core contains glass, and also a planar optical polymer waveguide whose core contains a polymer and/or a mixture of polymers, furthermore means that effect the change in the temperature of the planar optical polymer waveguide and wherein the refractive index of the planar optical polymer waveguide is greater than the refractive index of the planar silicon-dioxide-containing optical waveguide. The refractive indices of the planar optical polymer waveguide and of the silicon-dioxide-containing optical glass waveguide can consequently be matched even by a small increase in the temperature of the planar optical polymer waveguide. In addition, only the propagation constant of the optical field in a silicon-dioxide-containing optical waveguide according to the invention is influenced by the coupling mode between silicon-dioxide waveguide and polymer waveguide.

12 Claims, 1 Drawing Sheet

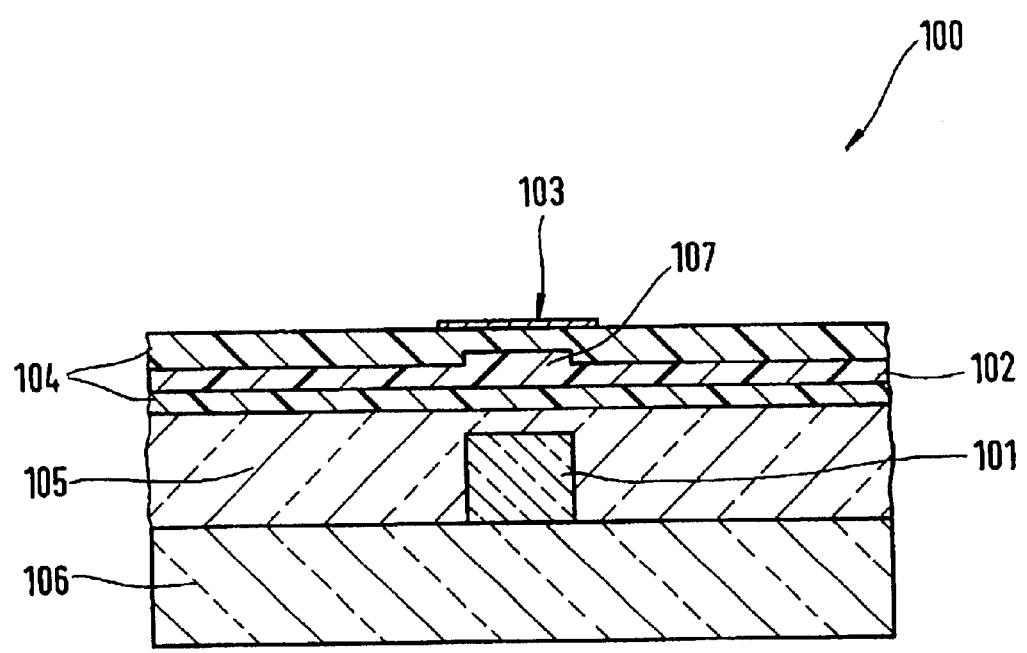

OPTICAL WAVEGUIDE PHASE SHIFTER

BACKGROUND OF THE INVENTION

The invention is based on a priority application EP 02 360 029.9 which is hereby incorporated by reference.

The present invention relates to an optical waveguide phase shifter comprising a planar silicon-dioxide-containing optical glass waveguide whose core contains glass, a planar optical polymer waveguide whose core contains a polymer and/or a mixture of polymers and also means that effect the change in temperature of the planar optical polymer waveguide. In addition, the invention relates to a method of changing the phase in optical waveguides.

Waveguide phase shifters or waveguide phase switches have already been described in the prior art. Thus, for example, it is known from EP 0997765 A2 to use optical waveguide switches that comprise a plurality of a number of glass waveguides disposed in parallel in a first layer, at least one polymer waveguide that encloses an acute angle with the glass waveguides being disposed in a layer situated on top thereof. Wherever the polymer waveguide crosses the glass waveguide situated thereunder, vertical coupling regions are produced. With the aid of heating electrodes, the coupling characteristics can be influenced in a selective manner. Consequently, light can be switched over from one glass waveguide into another glass waveguide disposed in parallel thereto, the temperature of the vertical coupling regions being adjusted in such a way that light coupled from the one glass waveguide into the polymer waveguide is relayed therein and coupled down in another coupling region into the desired glass waveguide.

Furthermore, the publication by N. Keil et al. entitled "Hybrid Polymer/Silica Vertical Coupler Switches" in EC10 2001 discloses optical waveguides for optical fibre communication networks that are used, for example for switching or for optical routing. In that case, a vertical coupling likewise takes place from silicon dioxide waveguides and polymer waveguides that are disposed above one another and wherein the temperature of the polymer waveguide can be controlled by means of heating elements. In the abovementioned article, a vertical coupling of the light conducted in the glass waveguide can be achieved by suitable choice of carrier layer, of the silicon-dioxide-containing waveguide layer and also of the polymer waveguide layer. However, the silicon-dioxide-containing waveguide layer and the polymer waveguide layer are in that case separated from one another by a so-called polymer "gap layer". In this case too, the light is conducted during or after the coupling in the polymer waveguide.

The demand for ever higher data rates for transmission in optical communication networks necessitates an increasing need for the correction of the transit-time errors on the (optical fibre) transmission link. The correction also consequently becomes necessary of higher-order chromatic dispersion (CD) or, alternatively, of polarization-mode dispersion (PMD). Fast optical phase shifters are necessary for the development of optical PMD or CD compensators.

The prior-art concepts discussed above and likewise usable for the abovementioned purpose do not satisfy, in particular, the requirements for speed, energy to be applied and any desired modification of the optical phase.

SUMMARY OF THE INVENTION

The object of the present invention was therefore to provide an optical waveguide phase shifter that makes it possible to modify the phase of optical signals as desired, wherein only a small energy is necessary and wherein the optical waveguide phase shifter can, in addition, easily be extended to a higher number of transmission channels.

This object of the present invention is achieved in that the optical waveguide phase shifter according to the invention comprises a planar silicon-diode-containing optical waveguide whose core contains glass, and also a planar optical polymer waveguide whose core contains a polymer and/or a mixture of polymers, furthermore means that effect the change in temperature of the planar optical polymer waveguide, and wherein the refractive index of the planar optical polymer waveguide is greater than the refractive index of the planar silicon-dioxide-containing optical waveguide.

Since the light conduction in the waveguide phase shifter disclosed here takes place only in the glass, the polymer waveguide used can be of very thin construction. This achieves the result that the refractive indices of the planar optical polymer waveguide (referred to below for the sake of simplicity as "polymer waveguide") and of the silicon-dioxide-containing optical glass waveguide (referred to below for the sake of simplicity as "glass waveguide") are matched even by a small increase in the temperature of the planar optical polymer waveguide and only the propagation constant of the optical field in the silicon-dioxide-containing optical waveguides is influenced by the coupling mode between glass waveguide and polymer waveguide.

The waveguide phase shifter according to the invention is consequently based on a vertical glass/polymer hybrid waveguide switch, the polymer waveguide being designed however in such a way that the optical wave cannot be propagated in it.

Light is not therefore coupled vertically into the polymer waveguide, with the result that only the phase of the optical field in the glass waveguide is influenced. In contrast to the abovementioned achievements of the prior art, the light is not conducted in the polymer waveguide, despite the coupling. This has the result that the energy to be applied to increase the temperature is very small (typically, the electrical heating power needed is <20 mW) and is also rapidly operative.

Surprisingly, all these advantageous effects have the result that the modification of the phase is possible with a very short response time of approximately 0.1–3, preferably 0.1–2 milliseconds.

This short response time is a basic prerequisite for the desired application in CD- or PMD-compensation components.

It is preferable that the polymer and/or the mixture of polymers of the planar optical polymer waveguide have/has a pronounced thermooptical effect. The refractive index of the polymer waveguide can thereby easily be matched to the refractive index of the glass waveguide by the selective temperature change, only a small energy being necessary, as a result of the pronounced thermooptical effect, to heat the means that effect the change in the temperature of the polymer waveguide.

In a preferred embodiment, the core of the planar glass waveguide is surrounded by a waveguide cladding layer that brings about a change in the refractive index of the glass waveguide. Consequently, the refractive index of the core of the glass waveguide can easily be adjusted and varied in a selective manner.

Preferably, two waveguide cladding layers are provided, of which the one comprises a polymer and/or a mixture of polymers and the other comprises silicon dioxide, with the result that the refractive index can be adjusted particularly simply and well by a systematic choice of the thickness and sequence of the respective waveguide cladding layers.

It is furthermore preferable that the core of the polymer waveguide is constructed in strip form. Because of its small and systematically adjustable thickness, the temperature gradient is consequently particularly small in its interior, with the result that the temperature changes due to the heating elements can be transmitted to the polymer waveguide without high temperature and time losses.

In an advantageous embodiment, the thickness of the core of the glass waveguide is 4–10 μm, preferably 5–8 μm. Furthermore, it is preferable that the thickness of the core of the planar polymer waveguide is 0.5–5 μm, preferably 1–3 μm.

The thickness of the glass waveguide and polymer waveguide and the thickness of the interlayers are adapted in accordance with the requirements relating to the maximum value of the phase shift and the wavelength of the light. The adjustment of the refractive index and, consequently, also the matching of the refractive indices of the polymer waveguide and of the glass waveguide are also influenced thereby.

Preferably, the means that effect the change in the temperature of the planar optical polymer waveguide are designed as heating elements, well known per se to the person skilled in the art, that can be easily provided and also easily heated.

The object of the present invention is furthermore achieved by a phase-change method in optical waveguides, wherein said method is performed using a waveguide phase shifter according to the invention, wherein the temperature of the planar optical polymer waveguide is changed in such a way that its refractive index is reduced with the result that light is coupled from the glass waveguide only into the polymer waveguide.

The method according to the invention achieves, in a simple way, the result that the propagation constants of the glass waveguide and polymer waveguide are matched and consequently only the phase of the light still conducted in the glass waveguide is altered. Consequently, the phase shifter operates without loss and, in particular, the material losses of the polymer waveguide for this application are insignificant.

Preferably, the use of an optical waveguide phase shifter according to the invention or of the method according to the invention in optical data transmission devices and in their individual components, for example in Mach-Zehnder interferometers, polarization-mode equalizers, dispersion equalizers, gain equalizers or Bragg gratings.

Definitions of all the abovementioned devices and components are to be found in "Glossary of Telecommunication Terms" FED-STD-1037C of the US "General Services Administration" Authority, to which reference is comprehensively made here.

Further advantageous refinements of the present invention are explained in the drawing below and by reference to an exemplary embodiment.

It goes without saying that the advantages and features of the invention mentioned above and explained below can be used not only in the specifically described combination, but also in other combinations accessible to the person skilled in the art without further thought or in isolation without departing from the scope of the invention.

BRIEF DESCRIPTION OF THE DRAWINGS

FIG. 1 shows a diagrammatic cross section through an optical waveguide phase shifter according to the invention.

The invention is explained diagrammatically in FIG. 1, reference being made to the drawing in the explanation of the exemplary embodiment.

FIG. 1 shows a diagrammatic cross section through a waveguide phase shifter 100. The optical waveguide phase shifter 100 comprises a lower cladding layer 106 (also referred to as "lower buffer", in English "buffer layer") preferably of silicon-dioxide-containing material having a thickness of 10–30 μm, for example of glass, and is preferably laminar.

In addition, the waveguide phase shifter 100 has a waveguide core 101 of an appropriately doped silicon-dioxide-containing material that is produced by patterning a glass layer. The waveguide core 101 has a higher refractive index than the material of the lower cladding layer 106. The waveguide core 101 has a thickness of approximately 6 μm.

Furthermore, the waveguide phase shifter 100 comprises an upper cladding layer 105 (also termed "upper covering" layer) having the same refractive index as the lower cladding layer 106. The entire glass waveguide is in this case constructed, for example, on a silicon substrate.

"Glass" is generally understood as meaning substances in the amorphous, non-crystalline solid state. The glass state can be interpreted in a physico-chemical sense as frozen, supercooled liquid or melt, it being possible to convert virtually every substance metastably into the glass state given a sufficiently high cooling rate of a melt or given the condensation of molecules from the vapour phase onto an extremely cooled substrate. In the present case, "glass" is defined as an inorganic, usually oxidic fusion product that is converted to the solid state by a freezing operation without crystallization of the molten-phase components.

Disposed above the glass waveguide is a polymer layer 104 that comprises a planar optical polymer waveguide 102 having a core 107 containing a polymer and/or a polymer mixture in the form of a strip having a thickness of 1.5 μm. In this connection, the core may have a somewhat greater thickness than the thickness of the remaining regions of the polymer waveguide 102, which are about 1.0 to 1.2 μm thick.

Disposed above the polymer layer 104 are heating elements 103, for example composed of a metal, such as chromium, or of a metal alloy.

The polymer of the planar polymer waveguide 102 has a pronounced thermooptical effect. This means that even small temperature changes have a profound effect on the refractive index of the polymer. Typically, suitable polymer materials have a temperature coefficient dn/dT of $-8 \times 10^{-5}$/K to about $-40 \times 10^{-5}$/K.

The temperature of the optical polymer waveguide and, consequently, its refractive index can now be controlled by the length. In this way, the phase of the light conducted in the underlying glass waveguide 101 can be influenced. The degree of influencing is controlled by the respective thickness of the layers 105, 104 and 102 and by the length of the polymer waveguide 107 and of the heating electrode 103.

Typically, these thicknesses are a few micrometres, this information relating, for the layer 105, to the thickness above the waveguide core 101.

For example, the thickness of the lower cladding layer 106 may be about 10–30 μm and that of the upper cladding layer 105 measured above the waveguide 101 about 1–6 μm, depending, inter alia, on the refractive index difference and the polymer material. The thickness of the polymer layers 104 is also in this connection about 1–10 $\mu m$ (preferably 3–4 $\mu m$ for the lower polymer layer) in order to minimize the distance of the heating electrode 103 from the strip waveguide 107.

For the purpose of the explanation below, the concept "glass waveguide" or "polymer waveguide" relates only to the respective waveguide cores. A glass waveguide is therefore an optical waveguide whose waveguide core is composed of glass. Corresponding remarks apply to a polymer waveguide.

The material of which the optional waveguide cladding layers are composed is in principle immaterial for the operation of the optical waveguide shifter according to the invention. It is only necessary to ensure that here, too, the refractive index difference necessary for the optical waveguide is maintained between waveguide core and waveguide cladding. Depending on the requirement, the refractive index differences are typically between 0.3% and 2%. The core of the optical glass waveguide is composed, for example, of silicon dioxide or silicon oxynitride which, for the purpose of systematically altering the refractive index may optionally contain additives such as germanium dioxide, titanium dioxide, boron oxide or phosphorous oxide. The use of a particular type of glass is, however, not necessary for implementing the inventive idea.

In order to guarantee light conduction in the glass waveguide, the refractive index of the optionally present cladding layers must be lower than the refractive index of the cores of the glass waveguide. Other prerequisites are in principle not imposed on the material properties of the cladding layers.

As mentioned above, this may involve only a single cladding layer or two different cladding layers, i.e. a cladding layer composed of a polymer and/or a mixture of polymers and, adjacently, a glass cladding layer, the sequence of the layers being optional, or of a sequence of polymer-containing or silicon-containing cladding layers. A single layer may, for example, also have a gradient with respect to its chemical composition.

For example, the glass waveguide may be completely surrounded by a glass cladding layer. Adjacently, said glass cladding layer may be completely surrounded by a polymer cladding layer. Building on this, further glass cladding layers or polymer cladding layers composed of different polymers and/or polymer mixtures may be built up in order to change the refractive index appropriately in this way.

Which of the variants is to be preferred in the individual case depends, inter alia, on the production methods that are to be used. However, the direct contact between the core of the polymer waveguide and the glass cladding layer has the result that heat that is produced by the heating electrodes and reaches the core is undesirably dissipated by the glass cladding layer, that has comparatively good thermal conduction. If a polymer cladding layer that isolates the two waveguides thermally from one another is disposed between the polymer waveguide and the glass waveguide, a phase shifter built up in this way can be operated with lower heat flows.

Examples of polymers for the planar optical polymer waveguide are the conventional polymers for optical applications, such as, for example, styrenes (for instance, pentafluorostyrene) or methacrylates (such as, for example, trifluoromethyl methacrylate and glycidyl methacrylate) or, alternatively, silicones, but the choice is not limited to these examples since the material losses of the polymer do not play a part in the phase shifter application. Crucial for this application are the refractive index and the possible refractive index variation for producing a polymer waveguide and the temperature coefficient dn/dT.

According to the invention, the means with which the temperature of the waveguide core of the polymer waveguide can be altered are, in general, metallic heating electrodes that are disposed on the upper side of the optical space switch. In this connection, the precise geometry plays only a subordinate role, it only being necessary to ensure that the temperature can be increased in the coupling region. As an alternative to the heating electrodes, cooling elements may, in principle, also be provided, for example in the form of Peltier coolers.

It is only essential that the temperature of the polymer waveguide cores can be systematically altered in the coupling region. It is then possible to alter the coupling properties of the coupling region by a temperature change using the thermooptical effect. In the exemplary embodiment shown, the geometrical dimensions of the coupling region and the refractive indices of the waveguides are chosen in such a way that, with a slight increase in the temperature of the polymer waveguide, its core has the same refractive index as the core of the glass waveguide.

The lower side of the optional cladding layer of the glass waveguide is, as a rule, mounted on a carrier, which is not shown and which may be, for example, a silicon crystal or a ceramic. It is also possible, however, to join that side of the cladding layer that supports the heating electrodes to a carrier, but this is not essential for the invention.

In a further embodiment of the invention, only a slight refractive index difference $\Delta n$ of about $10^{-4}$ is adjusted between glass waveguide and polymer waveguide and this disappears if the temperature of the polymer waveguide core is increased with the aid of a heating element. The lower the refractive index difference $\Delta n$ is, the less heat has to be supplied in order to make the refractive index difference disappear and the higher are the achievable switching speeds.

If the actual refractive index difference $\Delta n$ deviates from its desired value in the unheated state, some of the light couples over permanently into the polymer waveguide, which makes itself evident, from a communications point of view, as crosstalk. Particular attention has therefore to be paid to maintaining the optimum refractive index difference $\Delta n$.

However, because of the different thermooptical effect of glass and polymer, the optimal refractive index difference $\Delta n$ may optionally be set within certain limits by regulating the temperature of the switch.

In the production of a switch according to the invention, recourse can be made without exception to methods known to the person skilled in the art for producing glass waveguides and polymer waveguides. For example, the silicon-dioxide-containing waveguides can be produced by standard flame hydrolysis deposition (FDH) and technologies such as reactive ion etching (RIE). After the structures have been produced in the silicon-dioxide-containing material, the uppermost cladding layers can be underetched by RIE. The polymer layer can then be applied, for instance, by spin coating. The polymer waveguide switch applied in this way is then etched again by RIE in order to form polymeric strip waveguides. An upper polymer layer is then applied and heating electrodes are applied by known methods.

It is, however, also possible within the scope of the present invention to combine, for example, any number of the single waveguide shifters shown in FIG. 1 with one another. This can be done in such a way that said waveguide shifters are disposed next to one another in order to provide a higher number of transmission channels. Another variant is to couple a multiplicity of glass waveguides disposed in parallel with a single polymer waveguide disposed transversely above all the glass waveguides.

What is claimed is:

1. Optical waveguide phase shifter comprising:
   a planar silicon-dioxide-containing optical glass waveguide whose core contains glass,
   a planar optical polymer waveguide whose core contains a polymer and/or a mixture of polymers,
   means for affecting the change in temperature of the planar optical polymer waveguide,
   and wherein the refractive index of the planar optical polymer waveguide is greater than the refractive index of the planar silicon-dioxide-containing optical glass waveguide.

2. Optical waveguide phase shifter according to claim 1, wherein the core of the planar silicon-dioxide-containing optical glass waveguide comprises a waveguide cladding layer.

3. Optical waveguide phase shifter according to claim 2, wherein the waveguide cladding layer comprises a polymer and/or a mixture of polymers or silicon dioxide.

4. Optical waveguide phase shifter according to claim 1, wherein the polymer and/or the mixture of polymers of the planar optical polymer waveguide and/or its core have/has a thermooptical effect.

5. Optical waveguide phase shifter according to claim 1, wherein two waveguide cladding layers are provided, characterized in that one comprises a polymer and the other comprises silicon dioxide.

6. Optical waveguide phase shifter according to claim 1, wherein the core of the planar optical polymer waveguide is strip-like.

7. Optical waveguide phase shifter according to claim 1, wherein the thickness of the core of the silicon-dioxide-containing planar optical glass waveguide is 4–10 $\mu$m.

8. Optical waveguide phase shifter according to claim 1, wherein the thickness of the core of the planar optical polymer waveguide is 0.5–5 $\mu$m.

9. Optical waveguide phase shifter according to claim 1, wherein the means that effect the change in temperature of the planar optical polymer waveguide are heating elements.

10. Phase-change method in optical waveguides using an optical waveguide phase shifter according to claim 1, wherein the temperature of the optical planar polymer waveguide is changed in such a way that its refractive index is reduced, with the result that the propagation constants of the glass waveguide and polymer waveguide couple and match.

11. Phase change method according to claim 10, wherein after the coupling, only the phase of the optical field in the glass waveguide is influenced.

12. Use of an optical waveguide phase shifter according to claim 1 and of a phase-change method in optical waveguides using an optical waveguide phase shifter wherein the temperature of the optical planar polymer waveguide is changed in such a way that its refractive index is reduced, with the result that the propagation constants of the glass waveguide and polymer waveguide couple and match, in optical data transmission devices.

* * * * *